UNITED STATES PATENT OFFICE.

GEORGE E. RICHMOND, OF ENID, OKLAHOMA.

THRASHING MACHINE.

1,424,119.

Specification of Letters Patent. Patented July 25, 1922.

Application filed July 28, 1919. Serial No. 313,695.

*To all whom it may concern:*

Be it known that I, GEORGE E. RICHMOND, a citizen of the United States, residing at Enid, in the county of Garfield and State of Oklahoma, have invented new and useful Improvements in Thrashing Machines, of which the following is a specification.

One object of my invention is the provision of a thrashing machine embodying an organized mechanism whereby the separation of the grain from the straw is effected within a space of small compass.

Another object is the provision of simple organized means for positively effecting the said separation.

Another object is the provision of means whereby the grain and chaff are conveyed from the separator casing into a cleaning apparatus apart from the separator casing, and all return matter from the cleaning apparatus is moved by a fan back through a dust collector into the peculiar concave complementary to the foremost beater where the return matter is rethreshed.

Another object is the provision in a thrashing machine of a feeder so constructed and arranged that as the band cutter revolves at a higher rate of speed than the toothed conveyor below it, the teeth of the conveyor will retard the lower portion of a bundle of grain while the band cutter and feeder above are raking off and feeding in the upper part of the bundle; the whole being connected with a friction governor disposed on the outside of the casing so as to enable the operator to observe the working of the same.

With the foregoing in mind, the invention in all of its details will be fully understood from the following description and claims when the same are read in connection with the drawings, accompanying and forming part of this specification, in which:

Similar numerals of reference designate corresponding parts in all of the views of the drawings.

Figure 3:
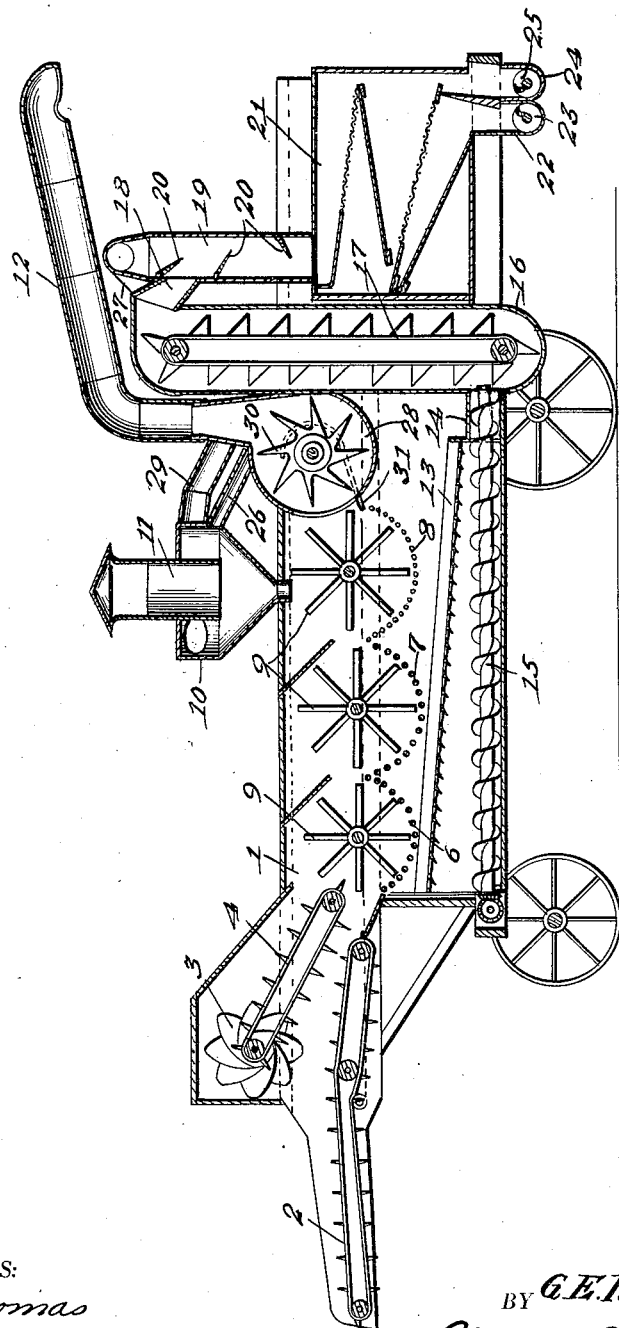
Figure 3 is a longitudinal vertical section of the machine.

Reference will first be had to Figure 3, wherein 1 is a separator casing, and 2 a toothed conveyor for bundles of grain. Disposed above and spaced from the conveyor 2 is a band cutter 3, and extending downwardly and forwardly from the said band cutter is a feeder 4. My invention contemplates driving the band cutter 3 considerably faster than the conveyor 2 so that the said conveyor 2 has the effect of holding back or retarding the lower portion of a bundle of grain while the band cutter and feeder 3 and 4, respectively, operate to rake off and feed forwardly the upper portion of the bundle. On the shaft of the band cutter 3 is a friction governor 5 Figure 1 which is arranged exteriorly of the casing 1 so as to be observed by the operator.

Arranged in the casing 1 in advance of the feeding mechanism is a series of (preferably three) concaves 6, 7, and 8. Each of the said concaves 6, 7 and 8 is composed of a plurality of transverse spaced rods, and by reference to Figure 3 it will be observed that the rearmost concave 8 is peculiar in that its transverse rods are comparatively small and are arranged comparatively close together for an important purpose hereinafter explicitly referred to. Complementary to each of the concaves 6, 7 and 8 is a rotary beater 9.

Arranged above the rearmost concave 8 and its beater 9 and communicating with the interior of the casing 1 is the body 10 of a dust collector from which extends upwardly an air eduction uptake 11 in communication with the atmosphere. The lower portion of the dust collector 10 is tapered downwardly as illustrated, for the delivery of tailings through the foremost concave and beater. As before mentioned, the transverse rods of the said concave are comparatively small and comparatively close together, in order to contribute to the efficient rethreshing of the tailings returned thereto, in the manner hereinafter described.

In communication with the interior of the casing 1 in advance of the rearmost concave 8 and its beater is the straw discharge spout 12 of the thresher.

From the concaves 6, 7 and 8 the grain and tailings gravitate to a riddle 13, longitudinally inclined as illustrated, and the grain passes through the foraminations in said riddle while the chaff and tailings pass forwardly and downwardly upon the same to a compartment 14. The bottom wall of the said compartment 14 is designed to receive chaff and tailings from the riddle 13 and discharge the same to the trunk 16. Disposed in the casing and below the riddle 13 is a screw conveyor 15. The grain and chaff are conveyed into an elevator trunk 16, and are raised by the elevator 17 therein, and are discharged through a chute 18 into an upstanding trunk 19 which is provided at intervals in its height with deflectors 20, preferably, though not necessarily, adjustable, and designed to cause the grain and chaff to take a tortuous course incidental to its descent. At its lower end the said upright trunk 19 opens into the casing 21 of a cleaning apparatus, the interior construction of which is preferably as shown at the right of Figure 3. From the said cleaning apparatus the clean grain is delivered to a transverse trough 22 in which is a screw conveyor 23, and the tailings are delivered from said casing 21 into a transverse trough 24 in which is a screw conveyor 25. The trough 22 leads to a suitable point of discharge exteriorly of the casing. At the left hand side of the machine, the trough 24 is in communication with the chamber 22× in which is an appropriate driven blast fan, and interposed between and connecting the said chamber 22× and the dust collector 10 is a conduit 26, designed to convey chaff to the said dust collector. The upper end of the upstanding trunk 19 is connected through a conduit 27 with the central portion of a fan casing 28, at the left-hand side of the thresher, as best appears in Figure 2. From this it follows that a certain portion of the tailings together with chaff will be removed by suction from the grain during the downward passage of the same in the trunk 19. It will also be observed by comparison of the three figures of the drawings that the fan casing 28 is connected with the dust collector 10 through the medium of a conduit 29; said conduit being arranged tangentially to the casing as well as to the body of the dust collector, and being designed for the delivery of tailings to the dust collector precedent to the rethreshing of such tailings. At 30 is the fan in the casing 28, and at 31 is a wall complementary to the fan and its casing, and designed to chute some of the tailings to the concave 8.

In the practical operation of the machine the grain is threshed between the beaters and the concaves, and the major portion of the straw is discharged through the spout 12. The grain and the chaff drop through the concaves to the sieve 13, after which the grain and the chaff and tailings are handled in the manner hereinbefore set forth in detail and which it is not deemed necessary to reiterate.

Figure 1:
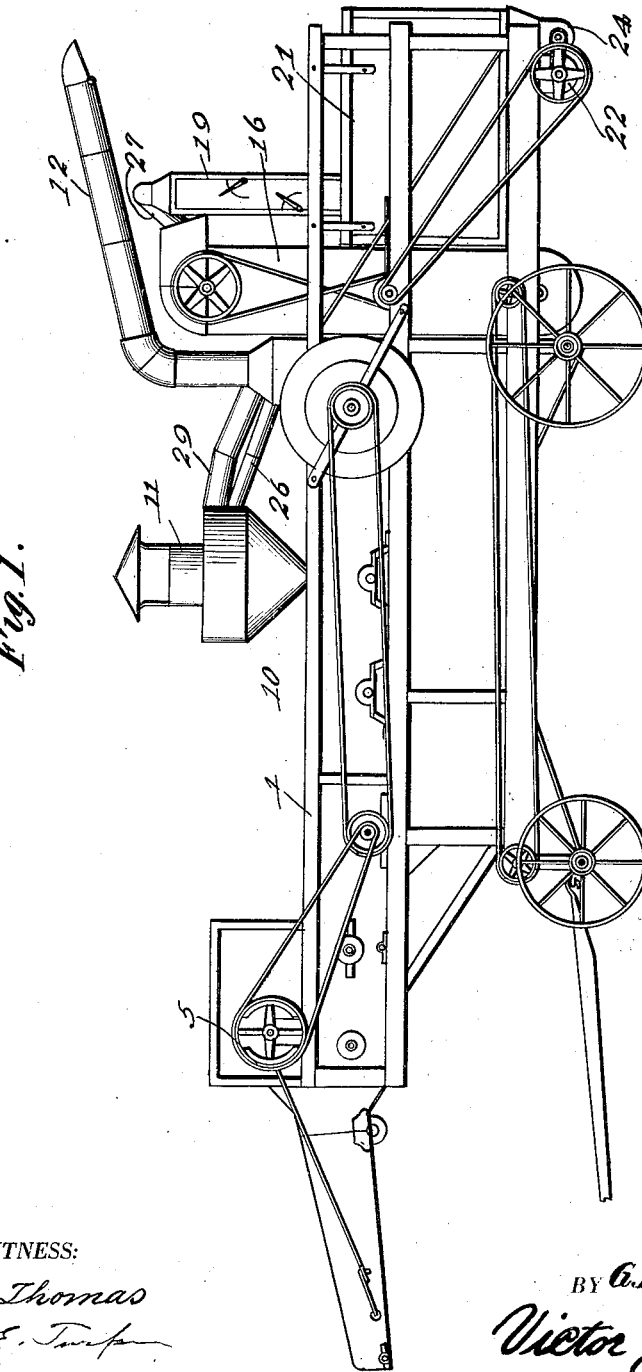
Figure 1 is an elevation of the right-hand side of a thrashing machine constituting the best practical embodiment of my invention that I have as yet devised.
Figure 2:
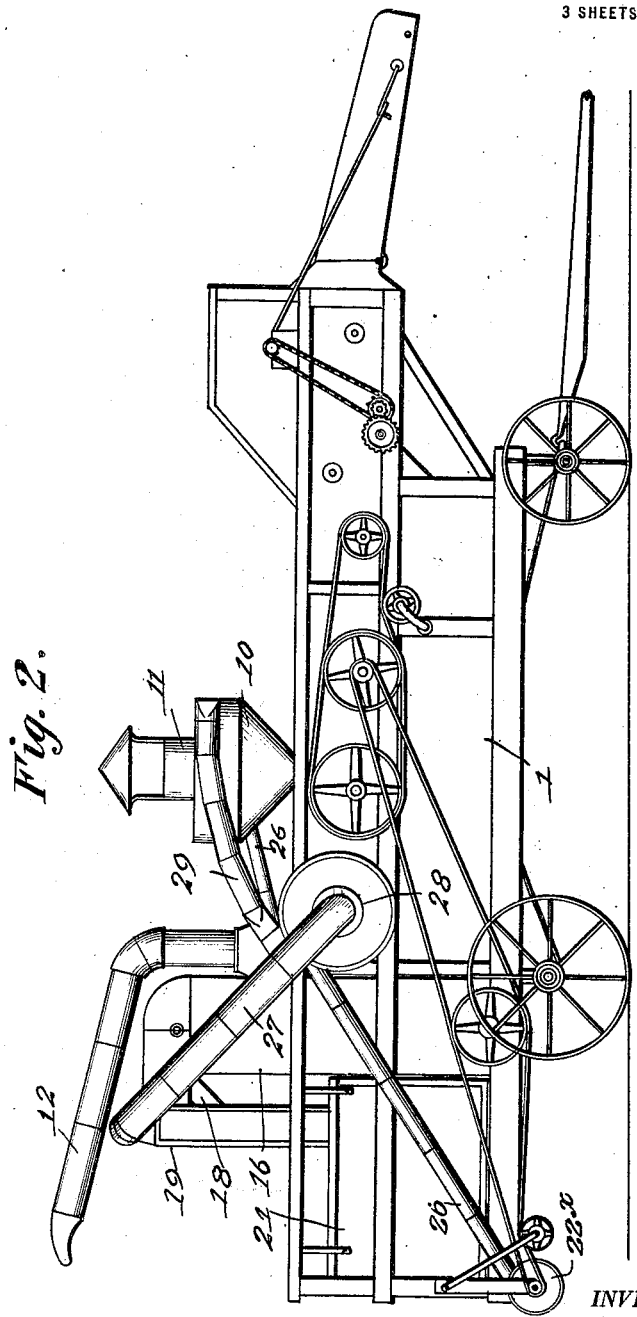
Figure 2 is a similar view of the left-hand side of the machine.

The driving connections for the several working parts of the thresher are clearly shown in Figures 1 and 2, and for this reason and also because the said driving connections are not of the essence of my invention, I have deemed it unnecessary to enter into a detailed description of the same.

Having described my invention, what I claim and desire to secure by Letters-Patent, is:

1. In a thrashing machine, the combination of a casing, a plurality of concaves arranged one in front of the other in the casing and respectively made up of transverse rods spaced apart; the rods of the rearmost concave being comparatively small in cross-section, and arranged comparatively close together, rotary beaters complementary to the concaves, cleaning means, means for conducting grain and tailings from the concaves to the cleaning means, and means for returning tailings from the cleaning means to the rearmost concave.

2. In a thrashing machine, the combination of a casing, a plurality of concaves therein, the rearmost concave having comparatively small interstices, beaters complementary to the concaves, cleaning means, means for conducting grain and tailings from the concaves to the cleaning means, and means for effecting the return of tailings from the cleaning means to the rearmost concave.

In testimony whereof I affix my signature.

GEORGE E. RICHMOND.